(12) United States Patent
Skold et al.

(10) Patent No.: US 10,775,294 B2
(45) Date of Patent: Sep. 15, 2020

(54) METHOD AND SYSTEM FOR COMPUTING A ROAD FRICTION ESTIMATE

(71) Applicant: VOLVO CAR CORPORATION, Gothenburg (SE)

(72) Inventors: Mats Skold, Gothenburg (SE); Tony Gustafsson, Askim (SE); Henrik Gullven, Molndal (SE)

(73) Assignee: VOLVO CAR CORPORATION, Gothenburg (SE)

( * ) Notice: Subject to any disclaimer, the term of this patent is extended or adjusted under 35 U.S.C. 154(b) by 391 days.

(21) Appl. No.: 15/726,852

(22) Filed: Oct. 6, 2017

(65) Prior Publication Data

US 2018/0106714 A1 Apr. 19, 2018

(30) Foreign Application Priority Data

Oct. 13, 2016 (EP) .................................... 16193750

(51) Int. Cl.
*G01N 19/02* (2006.01)
*B60T 8/1764* (2006.01)
*B60T 8/171* (2006.01)
*B60W 40/068* (2012.01)

(52) U.S. Cl.
CPC ............ *G01N 19/02* (2013.01); *B60T 8/1764* (2013.01); *B60T 8/171* (2013.01); *B60T 2210/12* (2013.01); *B60T 2210/124* (2013.01); *B60T 2270/213* (2013.01); *B60W 40/068* (2013.01); *B60W 2520/00* (2013.01); *B60W 2520/10* (2013.01);

(Continued)

(58) Field of Classification Search
None
See application file for complete search history.

(56) References Cited

U.S. PATENT DOCUMENTS

| 2005/0055149 A1 | 3/2005 | Kato et al. |
| 2006/0086560 A1 | 4/2006 | Furusho et al. |
| 2008/0262692 A1 | 10/2008 | Kogure et al. |

(Continued)

FOREIGN PATENT DOCUMENTS

| DE | 102016105498 A1 | 9/2016 |
| JP | 2011-57036 A | 3/2011 |

OTHER PUBLICATIONS

Extended European Search Report dated May 15, 2017, Applicant No. 16193750.3-1762, Applicant Volvo Car Corporation, 9 Pages.

(Continued)

*Primary Examiner* — Gregory J Toatley, Jr.
*Assistant Examiner* — Terence E Stifter, Jr.
(74) *Attorney, Agent, or Firm* — Brooks Kushman P.C.

(57) ABSTRACT

A method is described for determining a friction estimate between a road surface and a tire of a vehicle, the tire being arranged on a steerable wheel of the vehicle, and the vehicle having an axle rack pivotably attached to a linkage arm connected to the steerable wheel such that a translational motion of the axle rack causes the linkage arm to rotate about a kingpin element such that the linkage arm causes a turning motion of the steerable wheel. The method includes acquiring a plurality of rack force values; acquiring a plurality of lateral wheel force values; mapping a relation between the plurality of rack force values and the lateral wheel force values to a model; and determining the lateral friction estimate based on the mapping.

14 Claims, 7 Drawing Sheets

(52) U.S. Cl.
CPC ... *B60W 2520/105* (2013.01); *B60W 2520/28* (2013.01)

(56) References Cited

U.S. PATENT DOCUMENTS

| | | |
|---|---|---|
| 2008/0294355 A1 | 11/2008 | Berthold et al. |
| 2010/0114431 A1* | 5/2010 | Switkes ............. B60T 8/17557 |
| | | 701/41 |
| 2011/0106458 A1 | 5/2011 | Shiozawa et al. |
| 2012/0024038 A1* | 2/2012 | von Tardy-Tuch ..... B60T 8/172 |
| | | 73/9 |
| 2016/0280251 A1* | 9/2016 | George .................. B62D 6/006 |

OTHER PUBLICATIONS

Hsu, Yung-Hsiang Judy, "Estimation and Control of Lateral Tire Forces Using Steering Torque," Dissertation, Stanford University, 2009, 188 Pages.

Matilainen, Mika, "Tyre Friction Potential Estimation by Aligning Torque and Lateral Force Information," Master Thesis, Aalto University School of Science and Technology, Nov. 24, 2010, 137 Pages.

Pacejka, Hans B., "Tire and Vehicle Dynamics," 1st Edition, 2002, Butterworth-Heinemann, Elsevier Ltd., Oxford, UK, (See e.g., Chapters 1 and 3), 624 Pages.

\* cited by examiner

METHOD AND SYSTEM FOR COMPUTING A ROAD FRICTION ESTIMATE

CROSS-REFERENCE TO RELATED APPLICATIONS

This application claims foreign priority benefits under 35 U.S.C. § 119(a)-(d) to European patent application number EP 16193750.3, filed Oct. 13, 2016, which is incorporated by reference in its entirety.

TECHNICAL FIELD

The present disclosure relates to a method for computing a friction estimate between a road surface and a tire of a vehicle. The present disclosure further relates to a corresponding system and to a vehicle.

BACKGROUND

Active safety is becoming more advanced in today's vehicles as the automotive technology is evolving. For example, most new vehicles are equipped with active safety in the form of the well-known ABS brake system which allows a more controlled braking action for the driver of the vehicle.

In a driving situation with a vehicle, the friction between the road and the tire is of high importance since it stipulates the amount of force that can be transferred from the vehicle to the ground. Thus, the friction is a parameter for active safety systems when decisions have to be taken related to for example braking and steering with the vehicle. This is relevant both for manually driven vehicles and for autonomous vehicles.

Figure 1A:
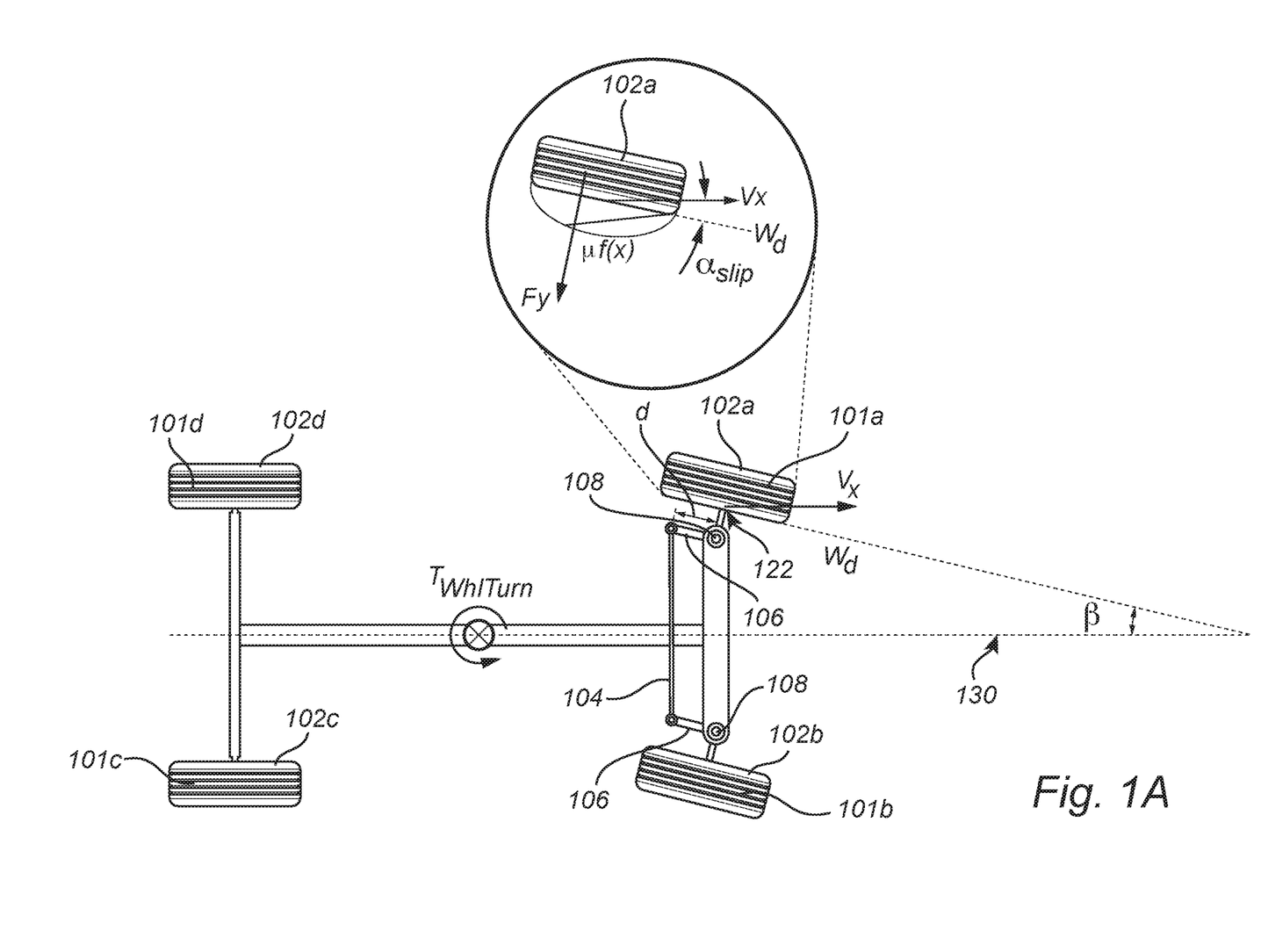
FIGS. 1A-C schematically illustrate parameters related to friction estimation.
Figures 1B, 1C:
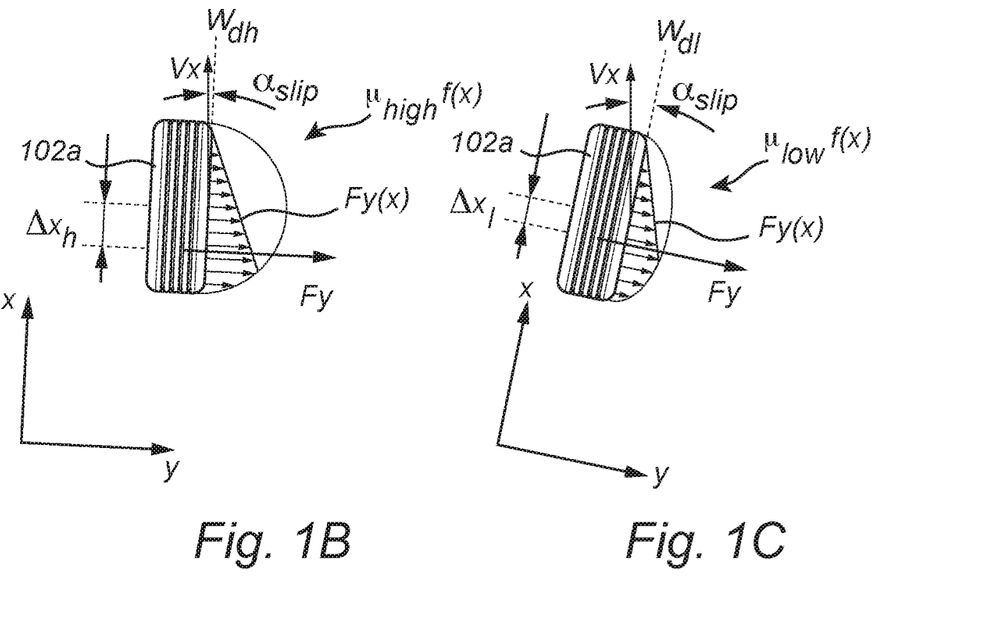

Friction estimation may generally be done by analyzing a tire force versus the so-called slip angle ($\alpha_{slip}$), see FIGS. 1A-C. The slip angle is the angle between the travel direction $V_x$ of the tire contact patch and the wheel hub direction $W_d$ (i.e., the pointing direction of the wheel). Turning to FIG. 1B which shows the wheel hub direction ($W_{dh}$), the travel direction ($V_x$), an assumed possible parabolic force distribution over the contact area between the tire and the road surface in the lateral direction (y) along x ($\mu_{high}f(x)$), the actual lateral force distribution $F_y(x)$, the resultant lateral force $F_y$, and the corresponding slip angle for a high friction case ($\mu_{high}$), and FIG. 1C which shows the wheel hub direction ($W_{dl}$), the travel direction ($V_x$), an assumed possible parabolic force distribution over the contact area between the tire and the road surface in the lateral direction (y) along x ($\mu_{low}f(x)$), the actual lateral force distribution $F_y(x)$ and the resultant lateral force $F_y$, and the corresponding slip angle for a low friction case ($\mu_{low}$). A comparison between FIGS. 1B-C illustrates that in order to maintain the same resultant lateral tire force $F_y$ magnitude (resulting from the actual lateral force distribution $F_y(x)$ acting on the tire), a larger slip angle is needed for the low friction case (FIG. 1C) compared to the slip angle in the high friction case (FIG. 1B). In other words, when the friction reduces between the tire and the road surface, a larger slip angle is needed to maintain the same lateral tire force $F_y$, i.e., the driver has to turn the vehicle further. The tire force (i.e., resultant force on the tire) may for example be derived from an inertial measurement unit of the vehicle or from the wheel torque. Furthermore, a pneumatic trail ($\Delta x_h$ and $\Delta x_l$) is defined as the orthogonal distance between the center of the contact patch between the tire and road and the resultant force vector $F_y$. Further details known in the art can be found in "Tire and vehicle dynamics" (Butterworth-Heinemann, Oxford, 2002) by Hans Pacejka.

US2011/0106458 describes to determine the road surface friction on the basis of the slip angle. One drawback of using the slip angle for road friction estimation is that it requires high accuracy determination of the slip angle for the full range of lateral wheel forces that occur during normal driving.

Accordingly, there is room for improvements in methods for determining road friction estimates.

SUMMARY

In view of above-mentioned prior art, it is an object of the present disclosure to provide an improved method for computing a friction estimate between a road surface and a tire of a vehicle that alleviates at least some of the above-mentioned drawbacks of the prior art.

According to a first embodiment of the disclosure, there is provided a method for determining a friction estimate between a road surface and a tire of a vehicle, the tire being arranged on a steerable wheel of the vehicle, and the vehicle comprising two front wheels and two rear wheels and an axle rack pivotably attached to a linkage arm connected to the steerable wheel such that a translational motion of the axle rack causes the linkage arm to rotate about a kingpin element such that the linkage arm causes a turning motion of the steerable wheel, the method comprising the steps of: acquiring a plurality of rack force values indicative of rack forces on the axle rack; acquiring a plurality of lateral wheel force values indicative of lateral forces on the steerable wheel when the plurality of rack force values are acquired, the lateral wheel force acting in a direction substantially parallel with a rotation axis of the wheel; mapping a relation between the plurality of rack force values and the lateral wheel force values to a model comprising a friction parameter; determining the lateral friction estimate based on the mapping.

The friction parameter may be comprised in the model directly or indirectly. When the friction parameter is indirectly comprised in the model is may be part of empirically determined data which forms the basis for the model and which the acquired data (lateral wheel force values and axle rack force values) is mapped onto. In case the friction parameter is directly comprised in the model, the parameter itself is part of the model definition and may be computed directly from the model.

The linkage arm may be a steering arm of the vehicle steering arrangement.

The present disclosure is based on the realization that the availability of friction estimations is increased by being able to calculate the friction without the need to determine the slip angle. It has been realized that the axle rack force may be measured and be related to the corresponding lateral wheel forces and that this relation may be directly used for friction estimation. In other words, the relation between the plurality of rack force values and the lateral wheel force values may be directly mapped to a model comprising a friction parameter. The disclosure is particularly advantageous during a steering operation of the vehicle when the friction is high and the magnitude of the lateral wheel force is high.

It was further realized that for a given lateral wheel force the pneumatic trail will decrease with decreasing friction due to an increasing slip angle, the result being a decrease in rack force. For example, when the friction reduces between the tire and the road surface, a larger slip angle is needed to maintain the same lateral wheel force, consequently the pneumatic trail is reduced and therefore also the rack force. In other words, there is friction dependence in the axle rack force that can be utilized in analysis of the relation between the axle rack force and the lateral wheel force in order to estimate the friction between the road surface and the tire.

The pneumatic trail also depends on the so-called caster angle of the wheel, however the caster angle of the wheel arrangement is fixed and may be included in the overall pneumatic trail.

Accordingly, embodiments of the disclosure may compute the friction between the tire of a wheel and the road in a way that is decoupled from determining the slip angle of the tire and thus increasing the availability of friction estimation.

According to one embodiment of the disclosure, the model may comprise a plurality of predetermined relations between rack force and lateral wheel force, wherein the mapping comprises matching the relation between the acquired plurality of rack force values and acquired the lateral wheel force values to one of the plurality of predetermined relations, wherein the friction estimate is determined based on the matching predetermined relation. Thus, the relation determined from the acquired data is compared to predetermined relations which may be empirically determined, or in another embodiment determined from knowledge of steering arm length and pneumatic trail.

In one embodiment of the disclosure, the model is a linear relation between the lateral wheel force and the rack force, the linear relation is based on predetermined data relating lateral wheel force and rack force to the friction parameter, wherein the mapping comprises: performing a linear regression to fit the acquired plurality of rack force values and the acquired plurality of lateral wheel force values to the linear relation, wherein the slope of the linear fit between the lateral wheel force values and the rack force values is indicative of the friction estimate.

In another embodiment, it may further be included to determine a plurality of ratios between the rack force values and respective the lateral wheel force values, wherein the slope of the linear fit between the lateral wheel force values and the rack force values is based on the plurality of ratios.

The model may be based on empirical data of lateral wheel force, rack force and friction between a tire of a vehicle and the road surface.

According to embodiments of the disclosure, the lateral friction estimate may be classified into different levels of nominal friction depending on the value of the lateral friction estimate, wherein the classification levels depend on at least one of: vehicle velocity, vehicle velocity variation during a batch time duration, level of wheel force excitation, distance to interval threshold.

According to embodiments of the disclosure, the model may be a non-linear relation between the lateral wheel force and the rack force, wherein the mapping comprises: fitting the plurality of lateral wheel force values and rack force values with a non-linear model comprising the friction parameter, whereby the lateral friction estimate is determined based on the fitting.

According to embodiments of the disclosure, the model may be a tan h—function relating rack force to wheel forces.

In yet another embodiment, the model may be based on linkage arm length of the vehicle and tire pneumatic trail. The length of the linkage arm (e.g., the steering arm of the vehicle) is fixed for each vehicle model and the pneumatic trail may be empirically determined or determined from knowledge about the tire dimensions and steering kinematics. For torque equilibrium, the torque generated by the resultant lateral force $F_y$ with the pneumatic trail as the lever should equal the torque from the rack force (which may be measured) with the linkage arm as the lever. Determining the friction estimate may be found more accurately by including mapping the measured lateral wheel force values and the rack force values with the known relation between linkage arm length and pneumatic trail (from torque equilibrium) which depends on friction.

According to embodiments of the disclosure, the lateral wheel force values and the rack force values may be accumulated for a batch time duration, further comprising: determining a friction estimate confidence value; when confidence value is larger than a threshold confidence, accepting the friction estimate.

The confidence value provides an indication the likelihood that the friction estimate is the true friction between the road and tire. For example, if lateral wheel force data and axle rack force data has been accumulated for a relatively long time the confidence value is higher compared to the confidence value if lateral wheel force data and axle rack force data has been accumulated for a relatively short time. The confidence value is empirically determined from experiments. For example, a certain confidence value is empirically determined for known e.g., accumulations duration, vehicle velocity, vehicle velocity variation, amount of wheel excitation (i.e., level of lateral wheel force), etc.

According to a second embodiment of the disclosure, there is provided a system for determining a friction estimate between a road surface and a tire of a vehicle, the tire being arranged on a steerable wheel of the vehicle, and the vehicle comprising two front wheels and two rear wheels and an axle rack pivotably attached to a linkage arm connected to the steerable wheel such that a translational motion of the axle rack causes the linkage arm to rotate about a kingpin element such that the linkage arm causes a turning motion of the steerable wheel, the system comprising: a force determining unit configured to determine a rack force value indicative of a rack force on the axle rack; a vehicle state estimator configured to determine a lateral wheel force value indicative of a lateral force on the steerable wheel, the lateral wheel force acting in a direction substantially parallel with a rotation axis of the wheel; and a control unit configured to: acquire a plurality of rack force values indicative of rack forces on the axle rack; acquire a plurality of lateral wheel force values indicative of lateral forces on the steerable wheel, map a relation between a plurality of rack force values and a plurality of lateral wheel force values to a model comprising a friction parameter; and, determine the lateral friction estimate based on the mapping.

The vehicle state estimator may advantageously comprise an inertial measurement unit (IMU).

A control unit may include a microprocessor, microcontroller, programmable digital signal processor or another programmable device.

Effects and features of the second embodiment f the disclosure are largely analogous to those described above in connection with the first embodiment of the disclosure.

There is further provided a vehicle comprising the system. The vehicle may for example be an autonomous vehicle.

In summary, the present disclosure relates to a method for determining a friction estimate between a road surface and a tire of a vehicle, the tire being arranged on a steerable wheel of the vehicle, and the vehicle an axle rack pivotably attached to a linkage arm connected to the steerable wheel such that a translational motion of the axle rack causes the linkage arm to rotate about a kingpin element such that the linkage arm causes a turning motion of the steerable wheel, the method comprising the steps of: acquiring a plurality of rack force values; acquiring a plurality of lateral wheel force values; mapping a relation between the plurality of rack force values and the lateral wheel force values to a model, and determining the lateral friction estimate based on the mapping.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

These and other features of the present disclosure will now be described in more detail, with reference to the attached drawings showing example embodiments of the disclosure.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

In the present detailed description, various embodiments of the system and method according to the present disclosure are described. However, this disclosure may be embodied in many different forms and should not be construed as limited to the embodiments set forth herein; rather, these embodiments are provided for thoroughness and completeness, and fully convey the scope of the disclosure to the skilled person. Like reference characters refer to like elements throughout.

Figure 2A:
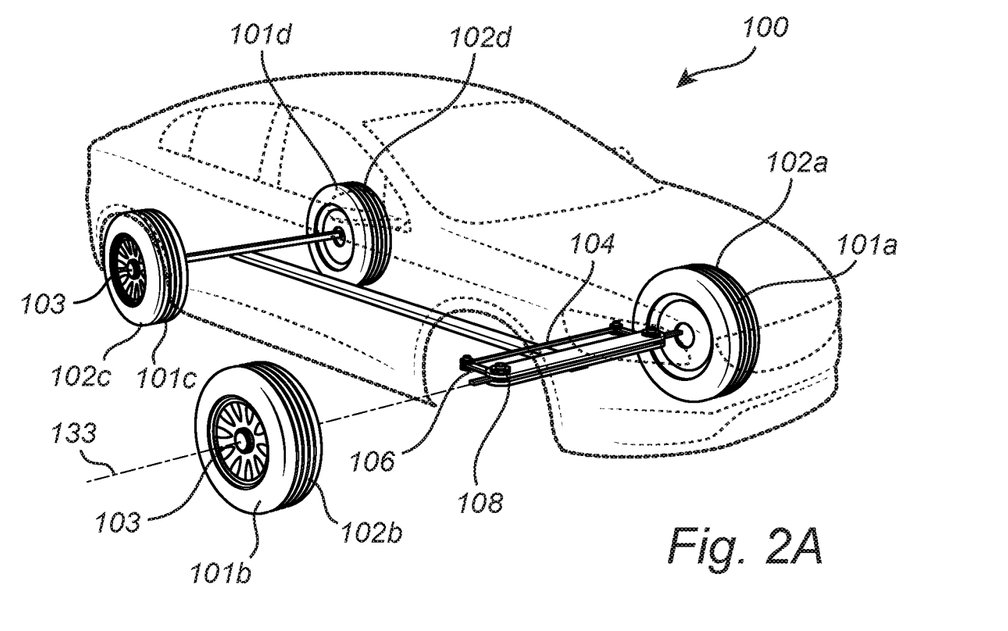
FIG. 2A conceptually illustrates a vehicle according to example embodiments of the disclosure.
Figure 2B:
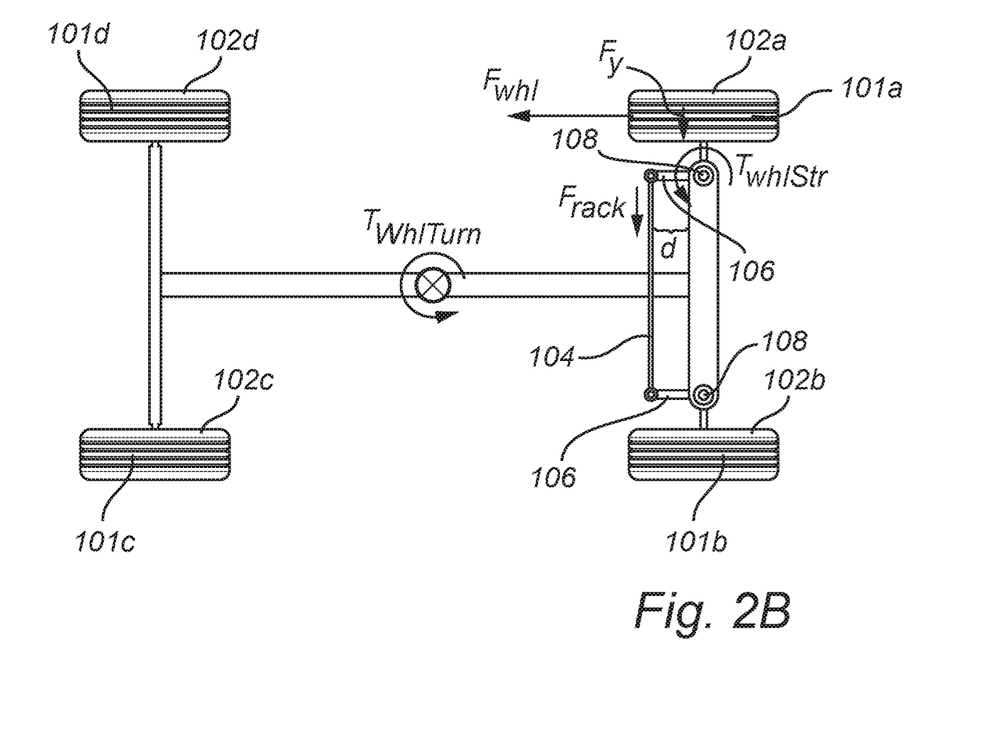
FIG. 2B conceptually illustrates a chassis wheel base with wheels of the vehicle in FIG. 2A.

FIG. 2A illustrates a vehicle 100 according to an embodiment of the disclosure. The vehicle 100 comprises at least one steerable wheel 102a-b. The steerable wheels 102a-b are here shown as the front wheels of the vehicle 100. The vehicle 100 further comprises rear wheels 102c-d. The wheels 102a-d each has a tire 101a-d mounted on a corresponding wheel hub 103 (not all are numbered). Furthermore, and with reference also to FIG. 2B, the vehicle 100 comprises an axle rack 104 pivotably attached to a linkage arm 106 which is connected to a steerable wheel 102a-b such that when the axle rack 106 is subjected to a force which causes a translational motion of the axle rack 104, the linkage arm 106 rotates about a kingpin 108 and thereby causes a turning motion of the wheel 102a-b. In this way, the vehicle is subject to a turning torque ($T_{WhlTurn}$). The vehicle 100 may for example be an autonomous car.

When applying a torque to a single front wheel 102a, the resulting force ($F_{Whl}$) between the wheel and the contact area (e.g., the road) generates a torque, $T_{WhlStr}$, that attempts to turn the front wheel 102a around the kingpin 108. The turning torque is in turn transferred to the axle rack 104 and can be monitored as the rack force, $F_{rack}$. In more detail and with reference to FIGS. 1B-C which illustrates a turning wheel (102a) at different friction conditions. The distance ($\Delta x_h$ and $\Delta x_l$) between the resultant lateral $F_y$ is known as the pneumatic trail. The pneumatic trail ($\Delta x_h$ and $\Delta x_l$) (together with the caster trail, here included in the pneumatic trail definition $\Delta x_h$ and $\Delta x_l$) effectively forms a lever for the resultant lateral force $F_y$. Thus, with the pneumatic trail ($\Delta x_h$ and $\Delta x_l$) as the lever, the lateral force $F_y$ generates a torque on the wheel 102a, this torque is denoted $T_{WhlStr}$. This torque translates via the linkage arm 106 having a length d, to the axle rack 104 where the axle rack force $F_{rack}$ can be measured. For torque equilibrium, the axle rack force $F_{rack}$ multiplied with the length d of the linkage arm should equal the torque $T_{WhlStr}$. In other words, pneumatic trail*$F_y$=d*$F_{rack}$.

In a low friction case (FIG. 1C), the assumed parabolic force distribution over the contact area between the tire and the road surface in the lateral direction (y) along x ($\mu_{high}f(x)$) has a lower maximum magnitude illustrated by the parabolic curve being closer to the tire 102a. Thus, in order to obtain the same resultant lateral force $F_y$ the wheel has to turn further (so that the lateral force distribution $F_y(x)$ includes more of the assumed maximum parabolic force distribution $\mu_{low}f(x)$) thereby increasing the slip angle α. This further moves the resultant lateral force $F_y$ closer to the center of the contact patch between the tire and the road, thus the pneumatic trail $\Delta x_l$ is shorter compare to in the high friction case ($\Delta x_h$ in FIG. 1B). Since the length d of the linkage arm 106 is the same in the high friction case and in the low friction case but the pneumatic trail varies, a difference in axle rack force will thereby reflect a difference in friction between the tire and road surface.

A wheel 102a subject to propulsion or braking (in FIG. 2B it is braking) is affected by lateral forces of different magnitude depending on the friction between the road surface and the tire of the wheel. The lateral force is generally a function ($F_y(T_{WhlStr}, \mu, \alpha_{slip})$) of the wheel torque ($T_{WhlStr}$), the coefficient of friction (μ), and the slip angle ($\alpha_{slip}$), see FIGS. 1A-C. The lateral force $F_y$ is measurable via the rack force Frank as described with reference to FIGS. 2A-B and FIGS. 1A-C. Furthermore, the slip angle ($\alpha_{slip}$) generally depends on the velocities of the vehicle (lateral velocity, longitudinal velocity, and yaw velocity) and the steering angle β (see FIG. 1A) of the vehicle. The steering angle is the angle between a longitudinal centerline 130 of the vehicle (between rear and front of the vehicle) and the wheel hub direction $W_d$ (see FIG. 1A). The steering angle may be measured by a steering angle sensor arranged on the steering column (not shown) of the vehicle. The sensor may measure the rotational angle of the steering wheel and thereby derive the steering angle. Another way to measure the steering angle is to determine the position (translational position) of the axle rack and therefrom derive the steering angle. Accordingly, the slip angle can generally be provided as a function (α(velocity, steering angle)) of the steering angle and the velocities. From the two functions $F_y(T_{WhlStr}, α_{slip})$ and α(velocity, steering angle) the friction μ may be derived. For details regarding the functions ($F_y(T_{WhlStr}, μ, α_{slip})$ and α(velocity, steering angle)) and relationships between the above parameters, see "Tire and vehicle dynamics" (Butterworth-Heinemann, Oxford, 2002) by Hans Pacejka (see in particular Chapter 1 and 3 of the Pacejka reference).

Different embodiments of the disclosure will now be described with reference to FIGS. 3-6.

Figure 3:
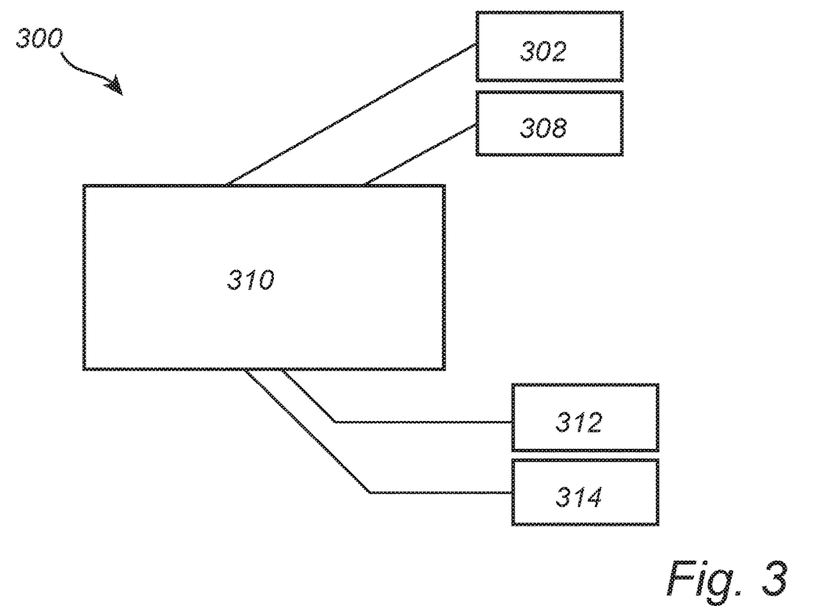
FIG. 3 schematically illustrates a system according to an exemplary embodiment of the disclosure.

FIG. 3 schematically illustrates a system for determining a friction estimate between a road surface and a tire of a vehicle 100 according to an example embodiment of the disclosure. The system 300 comprises a force determining unit which may be embodied as an electrical powered assisted system 302 for a steering arrangement assisting the driver with power for steering of the vehicle (i.e., to apply a force on the axle rack 104). The force determining unit is configured to determine a rack force value indicative of a rack force on the axle rack 104. The system 300 further comprises vehicle state estimator comprising an inertial measurement unit (IMU) 308 for determining a lateral wheel force value indicative of a lateral force on the steerable wheel 102a-b. The IMU 308 may also be configured to determine wheel forces in other directions such as for example normal to the plane of the ground at the contact surface between the tire and road. The IMU 308 may comprise accelerometers and/or gyroscopes such that e.g., acceleration and velocities of the vehicle in at least the dimensions in the plane of the contact surface between the vehicle 100 tire and the ground can be determined. However, the IMU 308 may determine the acceleration and velocities in all three dimensions if required. Based on measured e.g., acceleration data, the vehicle mass and inertia, the lateral force can be determined (via e.g., Newton second law relating mass and acceleration to force). There is further a control unit 310 which is configured to acquire a plurality of rack force values indicative of rack forces on the axle rack 104 from the force determining unit 302 and the lateral rack force values from the IMU 308. The control unit module 310 is further configured to map a relation between a plurality of rack force values and a plurality of lateral wheel force values to a model comprising a friction parameter, and to determine the lateral friction estimate based on the mapping.

Furthermore, the system 300 comprises a wheel speed sensor 314. The wheel speed sensor 314 is configured to determine the angular velocity of the wheel and may be provided in the form of a tachometer arranged in the hub of a wheel. In addition, the system may comprise a global positioning system (GPS) 312. With the GPS 312 and the wheel speed sensor 314 the velocity of the vehicle may be determined with improved accuracy.

Figure 4:
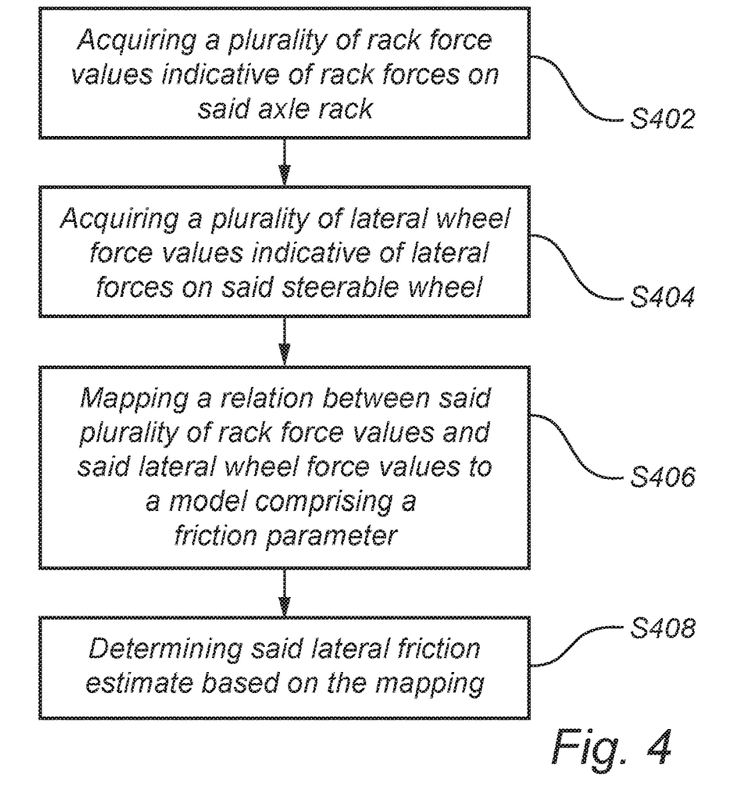
FIG. 4 is a flow-chart of method steps according to an exemplary embodiment of the disclosure.

FIG. 4 illustrates a flow chart of method steps according to an embodiment of the disclosure. In step S402 a plurality of rack force values indicative of rack forces on the axle rack are acquired. A plurality of lateral wheel force values indicative of lateral forces on the steerable wheel are acquired in step S404. A relation between the acquired rack force values and the acquired lateral wheel force values is mapped S406 to a model comprising the friction parameter. The friction estimate is determined based on the mapping S408. The model comprises a plurality of predetermined relations between lateral wheel force and axle rack force each for a different friction parameter. During the mapping, the predetermined relation that matches the acquired data best (i.e., with the highest confidence), is selected, and the corresponding friction parameter is selected as the lateral friction.

In one embodiment, the model is a linear relation between the lateral wheel force and the rack force including the friction parameter. The friction estimate is determined based on a plurality of ratios (n number of ratios) between rack force values ($F_{rack}$) and lateral wheel force values ($F_y$) sampled during a batch time duration. The ratios are used in a linear regression to fit a straight line to the accumulated data ($F_{rack}$ vs. $F_y$) where the slope of the straight line may be given by:

$$K_{est} = \frac{\sum_{i=1}^{n} F_{y,i} F_{rack,i}}{\sum_{i=1}^{n} F_{y,i}^2}.$$

The sampling of data (e.g., rack force values and lateral wheel force values) may be continued until an appropriate amount of data has been accumulated. For example, it may occur that data are acquired during unsatisfying conditions (not laterally well excited), e.g., during low wheel forces, too high sample variation, or unsatisfactory turn angle of the vehicle, then the unsatisfactory data points are disqualified and the accumulation continues.

When the data batch is satisfactory, i.e., laterally well excited, the variance of the data is checked. If the variance is not too large, the data is processed for determination of the friction estimate. If the variance is too large, or if $K_{est}$ is lower than a threshold K-value, the data batch is disqualified and the confidence is set to zero.

The friction estimate may be classified into different levels of friction depending on the estimate. For example, nominal friction values may be "high", "medium", or "low" with assigned nominal friction values 0.8, 0.5, 0.3, respectively. The classification may further be based on the vehicle velocity, vehicle velocity variation during the batch time duration, level of wheel force excitation, or distance to interval threshold. The classification levels have been empirically found, thus for a given set of vehicle velocity, vehicle velocity variation during the batch time duration, level of wheel force excitation, or distance to interval threshold a certain classification is set. The level of wheel force excitation is the level of lateral wheel force, for example, if the lateral wheel force is too weak the estimation of $K_{est}$ is not accurate since the data spread is narrow leading to small gradient of the linear fit. The "distance to interval threshold" is how close the acquired fitted data is to match another model relation. For example, for the classification, the parameter $K_{est}$ is determined to be within a certain predetermined interval among several intervals and if the difference between the determined $K_{est}$ and an interval end or start point is small the confidence may be reduced. The classification is thus based on the confidence value that depends on vehicle velocity, vehicle velocity variation during a batch time duration, level of wheel force excitation, and distance to interval threshold. The confidence dependencies on these parameters and the respective tables may be empirically predetermined.

Figure 5A:
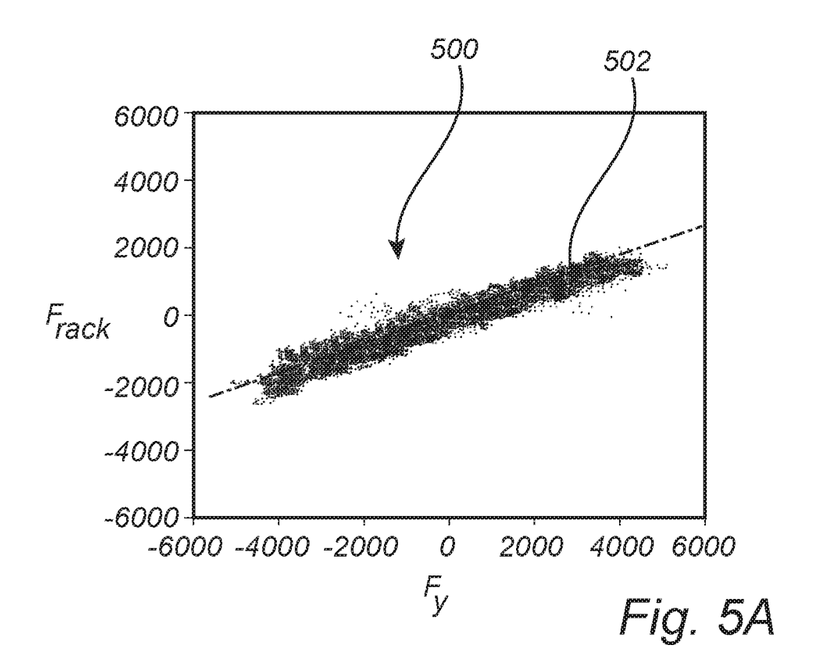
FIGS. 5A-B each conceptually shows lateral wheel force values versus axle rack force and a fitted curve based on a linear model.
Figure 5B:
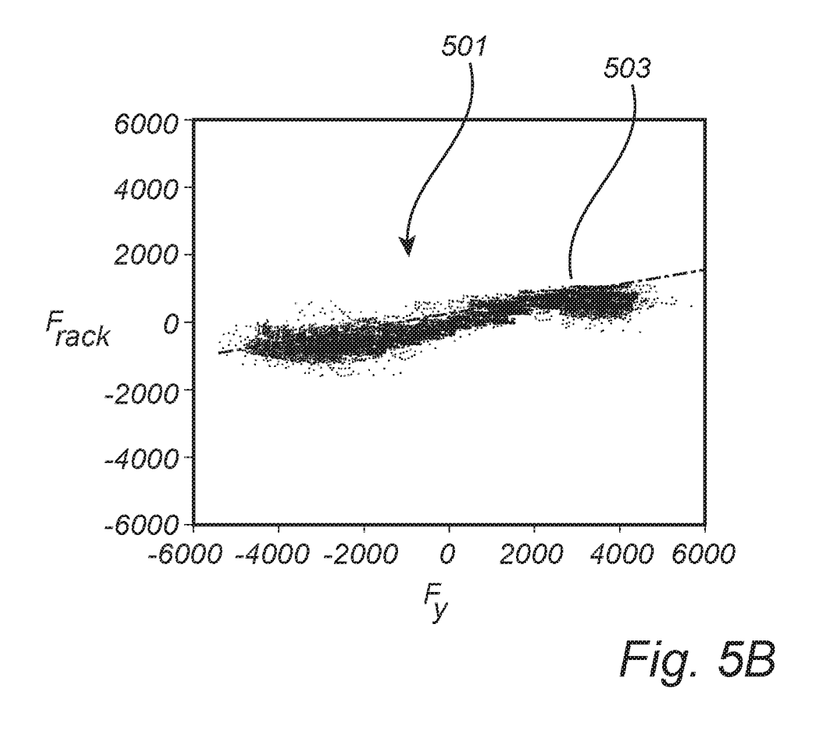

FIGS. 5A-B each illustrates a graph of exemplary rack force data ($F_{rack}$) versus lateral wheel force ($F_y$). The input for the method according to this embodiment is the rack force data ($F_{rack}$) and the lateral wheel force data ($F_y$). The data batch (500 in FIG. 5A and 201 in FIG. 5B) has been accumulated for a batch time duration and are considered well excited and with sufficiently high confidence. In this case, a linear model is used and thus $K_{est}$ is included in the linear regression as described above. Based on the linear regression, a linear curved is fitted with the rack force data ($F_{rack}$) versus lateral wheel force ($F_r$). The linear curves 502 and 503 in FIG. 5B has gradients $K_{est1}$ and $K_{est2}$ respectively, which determines a classification of the nominal friction between the road and tire. Friction is classified into "high", "medium", and "low" depending on the value of $K_{est}$ (i.e., the gradient of the linear fit). For example, a high friction may be assigned a value of nominal friction of 0.8, medium friction may be assigned a nominal friction of 0.5, and low friction may be assigned a nominal friction of 0.3. The classification levels (e.g., high, medium, low) are predefined based on empirical data, for example it has empirically been found that when $K_{est}$ is above a threshold, the friction is high and thus a nominal friction of 0.8 may be assigned. Alternatively or additionally, the classification levels are found from knowledge of the linkage arm length (d) and the pneumatic trail based on torque equilibrium described with reference to FIGS. 1B-C. In the exemplary case shown in FIG. 5A, the estimated $K_{est1}$ is below a threshold $k_3$ but exceeds a threshold $k_2$ and thus is assigned a nominal friction of 0.8 and is thus classified into high friction. In the exemplary case shown in FIG. 5B, the estimated $K_{est2}$ exceeds a threshold $k_1$ and thus is assigned a nominal friction of 0.3 and is classified into low friction. If a third $K_{est3}$ is below the threshold $k_2$ but exceeds the threshold $k_1$ it may be assigned a nominal friction of 0.5 and is thus classified into medium friction. The relation between the thresholds may be that $k_1<k_2<k_3$. With linear curve fitting in combination with the classification procedure, a convenient way to estimate the friction conditions without requiring complex modelling of the physical conditions between the tire and road.

Figure 6A:
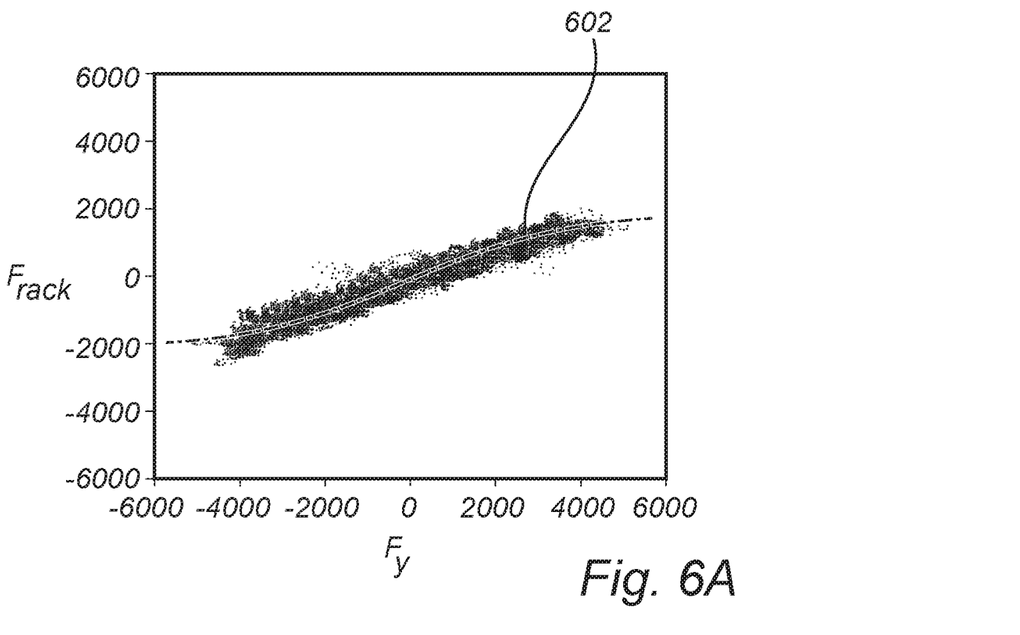
FIGS. 6A-B each conceptually shows lateral wheel force values versus axle rack force and a fitted curve based on a non-linear model.
Figure 6B:
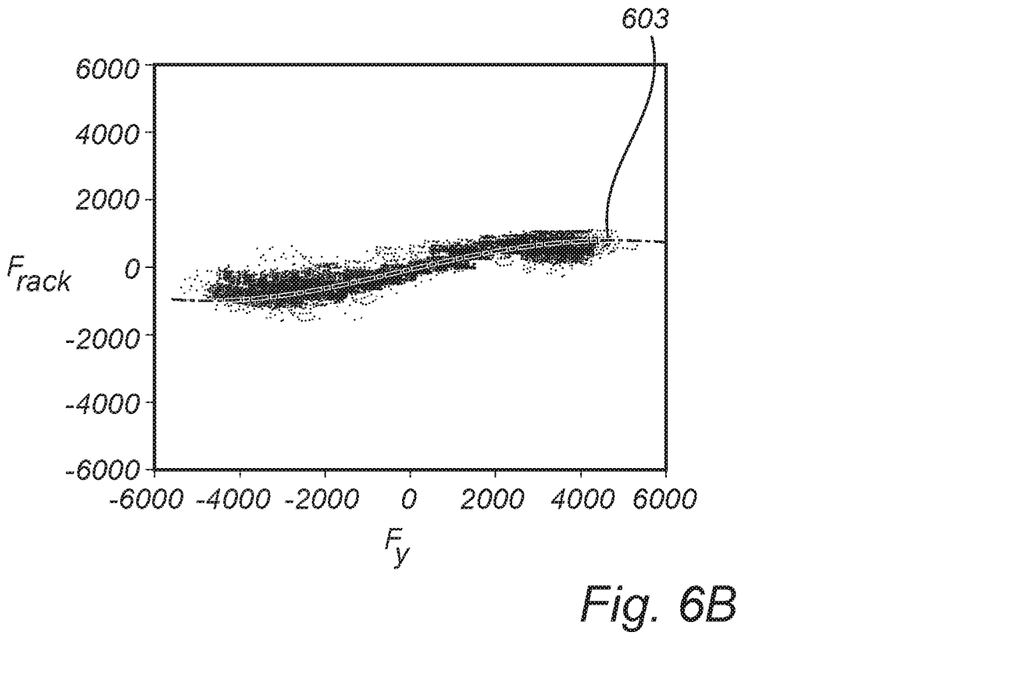
Figure 6C:
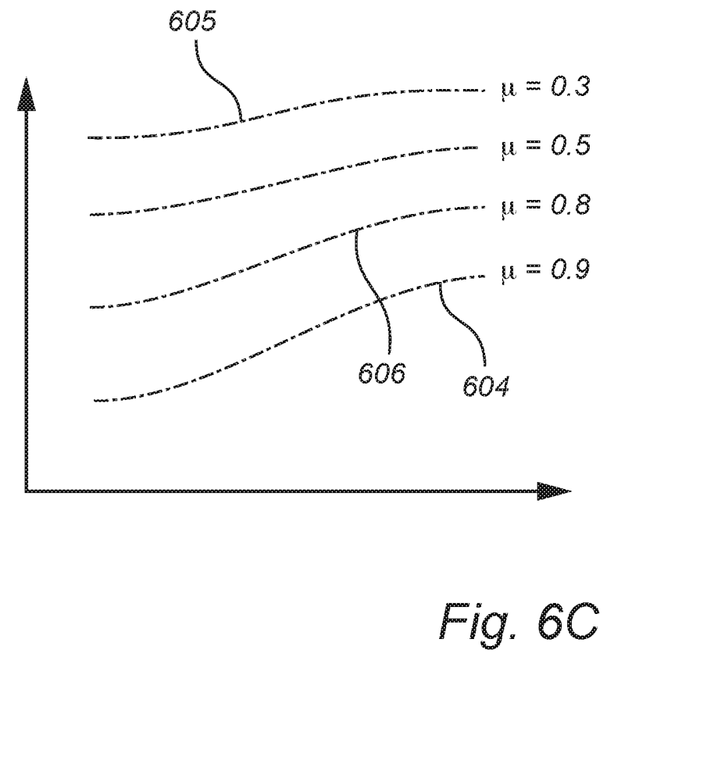
FIG. 6C conceptually illustrates predetermined relations between lateral wheel force and axle rack force under known friction conditions.

In a further embodiment, still with rack force data ($F_{rack}$) and lateral wheel force data ($F_r$) as the input to the method, a non-linear model function is used. FIGS. 6A-B each illustrate a graph of such exemplary rack force data ($F_{rack}$) versus lateral wheel force ($F_r$) for a high friction case (FIG. 6A) and a low friction case (FIG. 6B). In each of the graphs shown in FIGS. 6A-B, a fitted curve 602, 603 based on a non-linear model is shown. The model used comprises a friction parameter directly included in the model function. For example, the model may be described by the function:

$$F_{rack}/F_z = \mu * \tan h(k/\mu * F_y/F_z),$$

Where the k is the pneumatic trail to steering arm length ratio, $F_y$ is the lateral wheel force and $F_z$ is normal wheel force, i.e., along the normal between the road and wheel contact surface. The lateral and normal wheel forces may be measured as described with reference to FIG. 3, i.e., using an IMU 304. Thus from collected data (F rack and lateral wheel forces $F_y$) the friction $\mu$ can be estimated by comparing the fitted curve with predetermined curves 604 (see FIG. 6C) which have been predetermined under known friction conditions. In other words, the fitted curve 602, 603 which is based on a non-linear model is matched with the predefined curves 604 determined with known friction conditions. The best match determines the friction estimate. In the exemplary cases shown in FIGS. 6A-B the fitted curve 602 matches with curve 606 which was determined under the nominal friction $\mu=0.8$ and the fitted curve 603 matches with curve 605 which was determined under the nominal friction $\mu=0.3$. The matching of the fitted curves with the predetermined curves may be performed using e.g., least square procedures known in the art.

In yet another embodiment, the model is a physical model of the friction between the vehicle tire and the road surface is used. The lateral force is generally a function ($F_y(T_{WhlStr}, \Delta x)$) of the wheel torque ($T_{WhlStr}$) and the pneumatic trail ($\Delta x$), see FIGS. 1A-C. The lateral force $F_y$ is measurable via the rack force $F_{rack}$ as described with reference to FIGS. 2A-B and FIGS. 1A-C. Furthermore, the pneumatic trail ($\Delta x$) generally depends on the velocities of the vehicle (lateral velocity, longitudinal velocity, and yaw velocity) the steering angle $\beta$ (see FIG. 1A) of the vehicle, and the friction between the road surface and the tire. The steering angle is the angle between a longitudinal centerline 130 of the vehicle (between rear and front of the vehicle) and the wheel hub direction $W_d$ (see FIG. 1A). The steering angle may be measured by a steering angle sensor arranged on the steering column (not shown) of the vehicle. The sensor may measure the rotational angle of the steering wheel and thereby derive the steering angle. Another way to measure the steering angle is to determine the position (translational position) of the axle rack and therefrom derive the steering angle. Accordingly, the pneumatic trail can generally be provided as a function ($\Delta x$ (velocity, steering angle, $\mu$) of the steering angle and the velocities. From the two functions $F_y(T_{WhlStr}, \Delta x)$ and $\Delta x$ (velocity, steering angle, $\mu$) the friction $\mu$ may be derived and this model may be used as a physical model of the friction. Measured lateral wheel force values and rack force values may thereby be mapped onto predetermined relations between lateral wheel force and rack force for known friction conditions. For example, as previously discussed with reference to torque equilibrium, $$F_y * \Delta x = d * F_{rack}, \text{ i.e., } F_{rack} = F_y * \Delta x/d.$$

Thus, by mapping measured rack force data and measured lateral wheel force data to a model of in this case the pneumatic trail comprising a friction parameter, a friction estimate may be obtained. For further details regarding the functions ($F_y(T_{WhlStr}, \Delta x)$ and $\Delta x$ (velocity, steering angle, $\mu$)) and relationships between the above parameters, see "Tire and vehicle dynamics" (Butterworth-Heinemann, Oxford, 2002) by Hans Pacejka (see in particular Chapter 1 and 3 of the Pacejka reference).

The control unit may include a microprocessor, microcontroller, programmable digital signal processor or another programmable device. It should also be noted that the system 300, force determining unit, electrical powered assisted system 302, inertial measurement unit 308, control unit module 310, GPS 312, as well as any other unit, module, system, device, arrangement or the like described herein may comprise and/or be implemented in or by one or more appropriately programmed processors (e.g., one or more microprocessors including central processing units (CPU)) and associated memory and/or storage, which may include operating system software, application software and/or any other suitable program, code or instructions executable by the processor(s) for controlling operation thereof, for providing and/or controlling interaction and/or cooperation between the various features and/or components described herein, and/or for performing the particular algorithms represented by the various functions and/or operations described herein.

The person skilled in the art realizes that the present disclosure by no means is limited to the embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for determining a friction estimate between a road surface and a tire of a vehicle, the tire being arranged on a steerable wheel of the vehicle, and the vehicle comprising an axle rack pivotably attached to a linkage arm connected to the steerable wheel such that a translational motion of the axle rack causes the linkage arm to rotate about a kingpin element such that the linkage arm causes a turning motion of the steerable wheel, the method comprising:
    acquiring a plurality of rack force values indicative of rack forces on the axle rack;
    acquiring a plurality of lateral wheel force values indicative of lateral forces on the steerable wheel when the plurality of rack force values is acquired, the lateral wheel forces acting in a direction substantially parallel with a rotation axis of the wheel;
    mapping a relation between the plurality of rack force values and the lateral wheel force values to a model comprising a friction parameter,
    determining a lateral friction estimate based on the mapping; and
    providing the lateral friction estimate to an active safety system of the vehicle for use in a determination related to braking or steering of the vehicle;
    wherein the model comprises a plurality of predetermined relations between rack force and lateral wheel force, wherein mapping comprises matching the relation between the acquired plurality of rack force values and the acquired plurality of lateral wheel force values to one of the plurality of predetermined relations, and wherein the friction estimate is determined based on the matching predetermined relation.

2. The method according to claim 1 wherein the model is a linear relation between the lateral wheel force and the rack force, the linear relation based on predetermined data relating lateral wheel force and rack force to the friction parameter, wherein the mapping comprises:
    performing a linear regression to fit the acquired plurality of rack force values and the acquired plurality of lateral wheel force values to the linear relation, wherein the slope of the linear fit between the lateral wheel force values and the rack force values is indicative of the friction estimate.

3. The method according to claim 2 further comprising:
    determining a plurality of ratios between the rack force values and the respective lateral wheel force values, wherein the slope of the linear fit between the lateral wheel force values and the rack force values is based on the plurality of ratios.

4. The method according to claim 1 wherein the model is based on empirical data of lateral wheel force, rack force and friction between a tire of a vehicle and the road surface.

5. The method according to claim 1 wherein the lateral friction estimate is classified into different levels of nominal friction depending on the value of the friction estimate, wherein the classification levels depend on at least one of: a vehicle velocity, a vehicle velocity variation during a batch time duration, a level of wheel force excitation, a distance to interval threshold.

6. The method according to claim 1 wherein the model is a non-linear relation between the lateral wheel force and the rack force, wherein the mapping comprises:
    fitting the plurality of lateral wheel force values and rack force values with a non-linear model comprising the friction parameter, whereby the friction estimate is determined based on the fitting.

7. The method according to claim 6 wherein the model is tan h function relating rack force to wheel forces.

8. The method according to claim 1 wherein the model is further based on linkage arm length of the vehicle and tire pneumatic trail.

9. The method according to claim 1 wherein the lateral wheel force values and the rack force values are accumulated for a batch time duration, the method further comprising:
    determining a friction estimate confidence value;
    wherein, when the confidence value is larger than a threshold confidence, accepting the friction estimate.

10. A system for determining a friction estimate between a road surface and a tire of a vehicle, the tire for arrangement on a steerable wheel of the vehicle, and the vehicle comprising an axle rack pivotably attached to a linkage arm connected to the steerable wheel such that a translational motion of the axle rack causes the linkage arm to rotate about a kingpin element such that the linkage arm causes a turning motion of the steerable wheel, the system comprising:
    a force determining unit configured to determine a rack force value indicative of a rack force on the axle rack;
    a vehicle state estimator configured to determine a lateral wheel force value indicative of a lateral force on the steerable wheel, the lateral wheel force acting in a direction substantially parallel with a rotation axis of the wheel; and
    a control unit configured to:
        acquire a plurality of rack force values indicative of rack forces on the axle rack;
        acquire a plurality of lateral wheel force values indicative of lateral forces on the steerable wheel;
        map a relation between a plurality of rack force values and a plurality of lateral wheel force values to a model comprising a friction parameter;
        determine a lateral friction estimate based on the mapping; and
        provide the lateral friction estimate to an active safety system of the vehicle for use in a determination related to braking or steering of the vehicle;
        wherein the model comprises a plurality of predetermined relations between rack force and lateral wheel force, wherein mapping comprises matching the relation between the acquired plurality of rack force values and the acquired plurality of lateral wheel force values to one of the plurality of predetermined relations, and wherein the friction estimate is determined based on the matching predetermined relation.

11. The system according to claim 10 wherein the vehicle state estimator comprises an inertial measurement unit and a wheel speed sensor.

12. The system according to claim 10 further comprising a global positioning system configured to determine a velocity of the vehicle.

13. A vehicle comprising the system according to claim 10.

14. A method for determining a friction estimate between a road surface and a tire of a vehicle, the tire being arranged on a steerable wheel of the vehicle, and the vehicle comprising an axle rack pivotably attached to a linkage arm connected to the steerable wheel such that a translational motion of the axle rack causes the linkage arm to rotate about a kingpin element such that the linkage arm causes a turning motion of the steerable wheel, the method comprising:

acquiring a plurality of rack force values indicative of rack forces on the axle rack;

acquiring a plurality of lateral wheel force values indicative of lateral forces on the steerable wheel when the plurality of rack force values is acquired, the lateral wheel forces acting in a direction substantially parallel with a rotation axis of the wheel;

mapping a relation between the plurality of rack force values and the lateral wheel force values to a model comprising a friction parameter;

determining a lateral friction estimate based on the mapping; and providing the lateral friction estimate to an active safety system of the vehicle for use in a determination related to braking or steering of the vehicle;

wherein the lateral friction estimate is classified into different levels of nominal friction depending on the value of the friction estimate, and wherein the classification levels depend on a vehicle velocity, a vehicle velocity variation during a batch time duration, a level of wheel force excitation, or a distance to interval threshold.

* * * * *

UNITED STATES PATENT AND TRADEMARK OFFICE
CERTIFICATE OF CORRECTION

PATENT NO. : 10,775,294 B2  
APPLICATION NO. : 15/726852  
DATED : September 15, 2020  
INVENTOR(S) : Mats Skold et al.

Page 1 of 1

It is certified that error appears in the above-identified patent and that said Letters Patent is hereby corrected as shown below:

In the Claims

Column 25, Lines 24-25, Claim 7:  
After "wherein the model is"  
Delete "tan h" and  
Insert -- tanh --.

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*